United States Patent [19]
Boone et al.

[11] 4,084,610
[45] Apr. 18, 1978

[54] TWO-STEP ROLL AHEAD IRRIGATION SYSTEM

[76] Inventors: Ralph D. Boone; Charles Griffin, both of 6020 N. Prince, Clovis, N. Mex. 88101

[21] Appl. No.: 735,882

[22] Filed: Oct. 27, 1976

[51] Int. Cl.² .................................................. B05B 3/18
[52] U.S. Cl. ...................................... 137/1; 137/344; 239/212
[58] Field of Search .................... 137/1, 344; 239/177, 239/212, 213

[56] References Cited
U.S. PATENT DOCUMENTS

| 3,766,937 | 10/1973 | Lundvall et al. ...................... 137/344 |
| 3,965,924 | 6/1976 | Kennedy ............................... 137/344 |

*Primary Examiner*—Alan Cohan
*Assistant Examiner*—Gerald A. Michalsky
*Attorney, Agent, or Firm*—Wendell Coffee

[57] ABSTRACT

An irrigation system is moved with an oscillating trojan bar operating against a lugged wheel. A drive pawl on the trojan bar drives the wheel forward on level ground or uphill. A hold-back pawl on the trojan bar keeps the wheel from running free when going downhill. The detent likewise contains an uphill pawl and a downhill pawl.

15 Claims, 4 Drawing Figures

TWO-STEP ROLL AHEAD IRRIGATION SYSTEM

BACKGROUND OF THE INVENTION

1. Field of the Invention.

This invention relates to agricultural irrigation and more particularly to the movement and roll ahead device of a vehicle to move irrigation pipe with sprinklers thereon.

2. Description of the Prior Art

Agricultural irrigation systems normally operate upon soft level ground and, therefore, normally there is not a problem of them rolling ahead. However, anytime the irrigation pipe is empty, there is a problem of the wind blowing it ahead. Although this problem is particularly acute with side roll systems requiring special preventative measures, (e.g., WATTS U.S. Pat. No. 3,618,859), the problem also exists with center pivot systems.

Trojan bar or ratchet driven center pivot systems having pawl drives and pawl detents are well known, (e.g., ZYBACK U.S. Pat. No. 2,604,359 and GORDON U.S. Pat. No. 2,893,643).

When the system is driven by a rotating electric motor such as BOYCE U.S. Pat. No. 2,711,615, the problem is controlled by the fact that these motors normally use a worm drive and the worm drive itself operates as a roll ahead device.

LUNDVALL ET AL, U.S. Pat. No. 3,766,937, sought a solution to the problem of roll ahead, which is usually a downhill problem, where each vehicle has two driven lugged wheels. His solution was to have detent bar, the length of which was the distance from the rim of one wheel to the rim of the next less the lug height. The lugs on the two wheels were offset from one another and the detent bar was moved from the rim of one wheel back to the rim of the other wheel, permitting a lug on the wheel having the detent bar removed from it to go forward while the detent on the opposite wheel prevented it from rolling ahead.

SUMMARY OF THE INVENTION

NEW AND DIFFERENT FUNCTION

We have invented a roll ahead system which prevents ratchet driven vehicles from rolling ahead freely.

The trojan bar itself has two pawls thereon, one is a driving pawl and the other is a roll ahead pawl. If the system has a tendency to roll ahead, the system is eased forward with the regular normal movement of the wheel lugs riding against a roll ahead pawl on the trojan bar. The detent has two pawls, the regular forward driving pawl and the roll ahead pawl. The detent pawls are pulled from the lugs on the wheel by a resilient connection to the trojan bar or its driving member.

Therefore, we have achieved a new and surprising result of being able to control the roll ahead with a trojar bar driven irrigation system as smoothly and effectively as a roll ahead is controlled with worm driven system, but with a much simpler system. We have eliminated the possibility of the wheel rolling ahead with jerks so that it slams into a stop detent. Thus, the novel arrangements of the parts work together to produce a new result. In combination the result is more than the sum of each of the parts separately.

OBJECTS OF THE INVENTION

An object of this invention is to control roll ahead in a trojan bar driven irrigation system.

Further objects are to achieve the above with a device that is sturdy, compact, durable, lightweight, simple, safe, efficient, versatile, and reliable, yet inexpensive and easy to manufacture, install, adjust, operate, and maintain.

Other objects are to achieve the above with a method that is versatile, rapid, efficient, and inexpensive, and does not require skilled people to install, adjust, operate, and maintain.

The specific nature of the invention, as well as other objects, uses and advantages thereof, will clearly appear from the following description and from the accompanying drawing, the different views of which are not necessarily to the same scale.

DESCRIPTION OF THE PREFERRED EMBODIMENT

Figure 1:
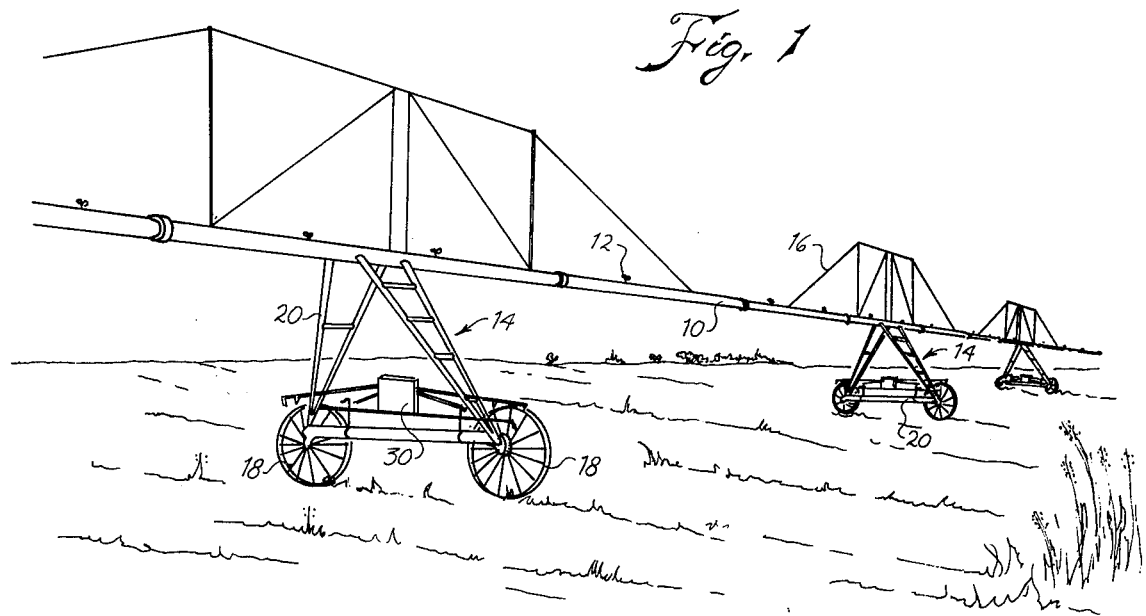
FIG. 1 is a perspective view of a portion of an irrigation system embodying this invention.
Figure 2:
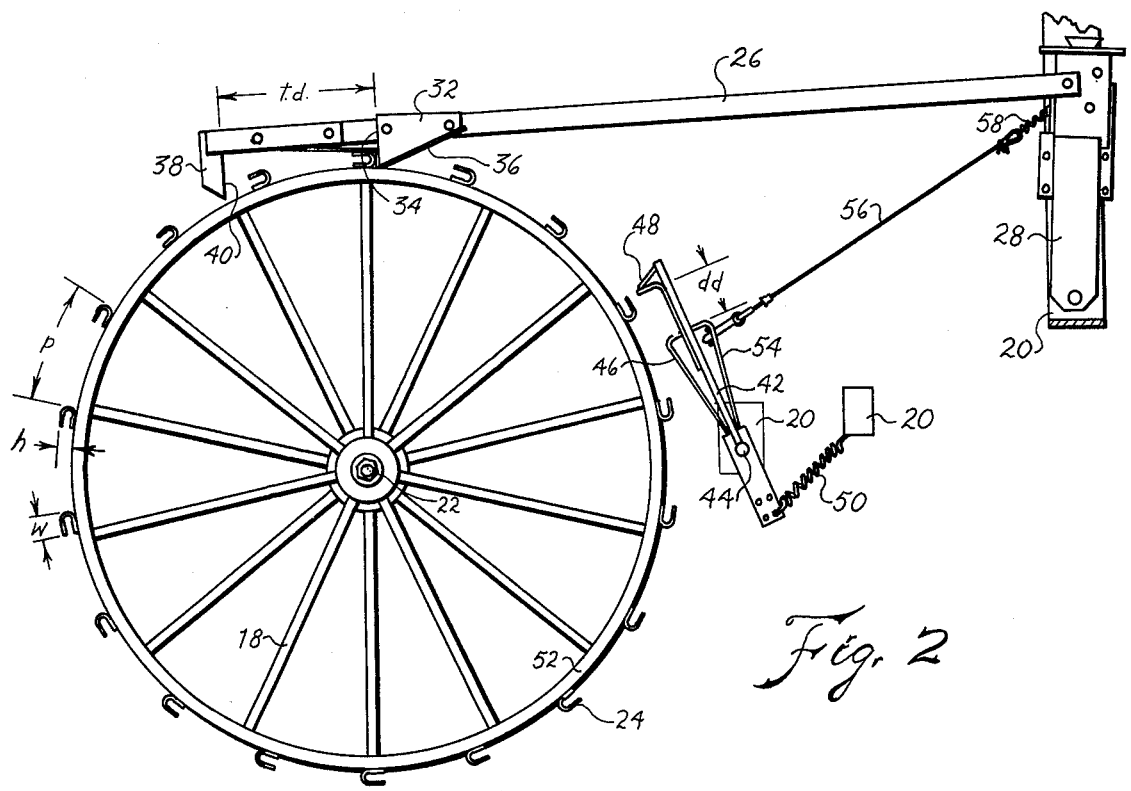
FIG. 2 is an elevational detail of the trojan bar and detent of one wheel with the trojan bar in about the center position.
Figure 3:
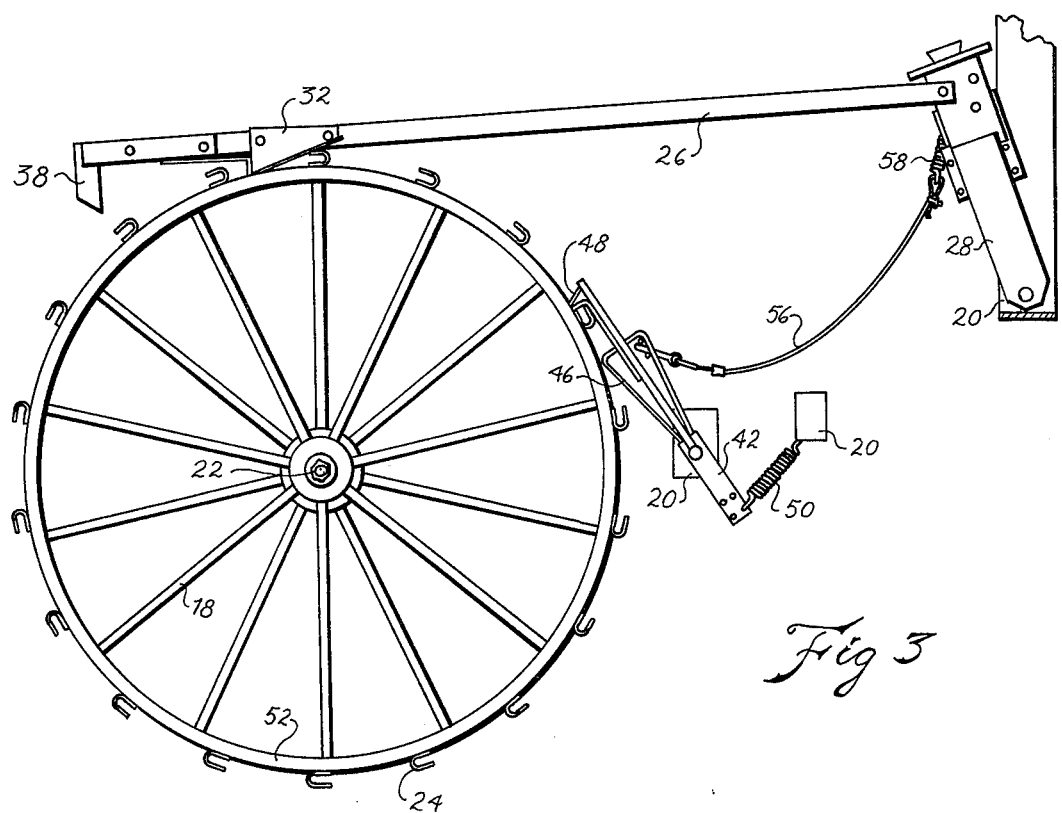
FIG. 3 is a detail of the wheel and drive similar to FIG. 2, but with the trojan bar in the forward position.
Figure 4:
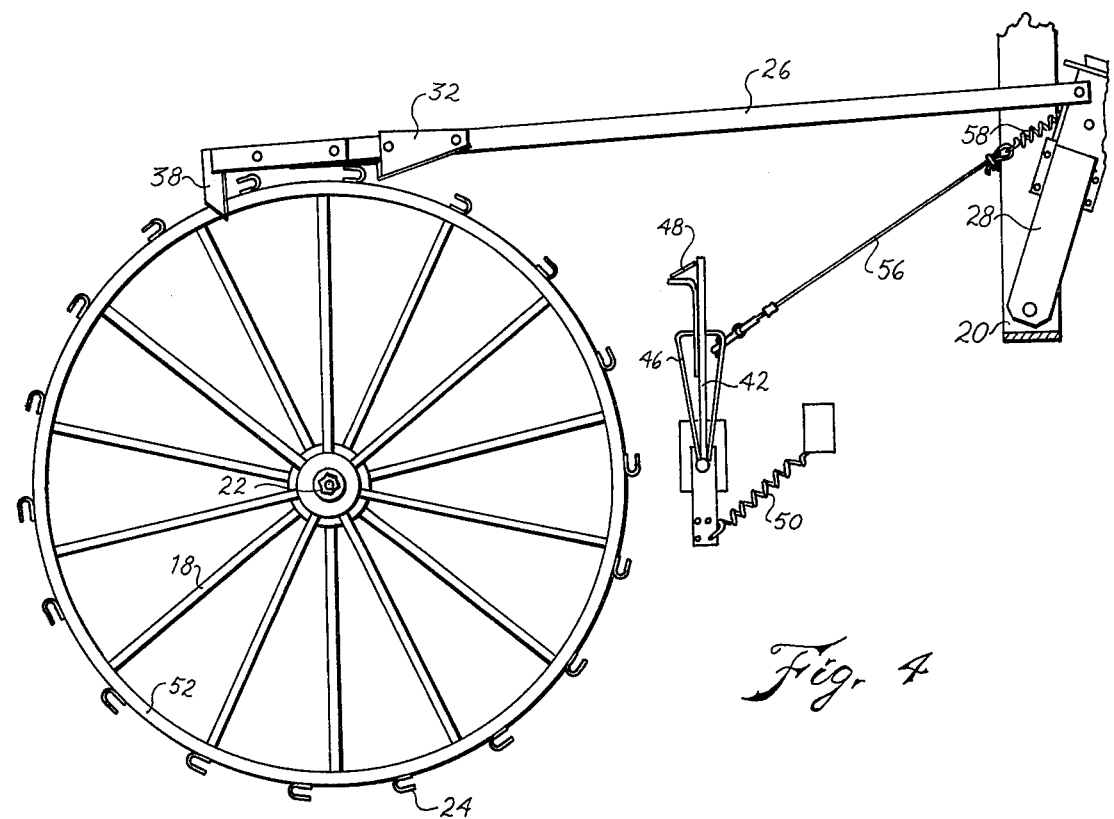
FIG. 4 is a detail similar to FIGS. 2 and 3, but with the trojan bar in the back position.

Referring to the drawing and more particularly to FIG. 1 thereof, there may be seen an irrigation system having elongated pipe 10. As customary, the pipe carries a plurality of sprinklers 12 and is adapted to carry water under pressure (source of pressurized water not shown). A plurality of vehicles 14 movingly support the pipe 10. The pipe is also supported by suspension wires 16 between the vehicles 14. Each of the vehicles is supported by two wheels 18, each of which is driven. However, our invention will work equally well if only one of the wheels is driven and, therefore, only one driven wheel is shown in FIGS. 2, 3, and 4.

Frame 20 connects the wheels 18 to the pipe 10. The wheels are mounted for rotation upon axles 22 attached to the frame 20 and the wheels have a plurality of evenly or regularly spaced lugs 24 thereon. Drive or trojan bar 26 is mounted on the frame and is attached to drive arm 28. The trojan bar 26 is oscillated by the drive arm 28. The drive arm 28 is oscillated by drive means 30. Inasmuch as the particular drive means is not pertinent to this invention and inasmuch as many types of water drives, hydraulic fluid drives, cable drives, etc., are known, the drive will not be described except to state that there are drive means on the vehicle for oscillating the drive bars forward and back.

Those skilled in the art will understand that all the parts described to this point are conventional and well known in the irrigation arts.

As illustrated, the drive arm 28 is pivoted to the frame. In FIGS. 2, 3, and 4, the frame is shown in four places, at the axle 22 and at three other places. For clarity in the drawing, the frame members are not connected together, but it will be understood that the elements marked "20" as well as the axle 22 are portions of the frame 20.

Trojan drive pawl 32 is attached to the trojan bar 26 spaced from the end thereof. It has flat driving face 34. The under side of the trojan drive pawl 32 forms cam 36, the purpose of which will be explained later. Trojan roll ahead pawl 38 is at the end of the trojan bar 26, it also having working face 40.

Detent 42 is pivoted by pin 44 to the frame 20. On one end of the detent there is detent drive pawl 46. Detent roll ahead pawl 48 is at the end of the detent beyond the detent drive pawl. Engaging spring 50 is on the opposite end, beyond the pin 44 from the detent roll ahead pawl. As may be seen, the engaging spring 50 biases the detent to cause the pawls 46 and 48 to engage the lugs 24 upon the rim 52 of the wheel 18. The detent is mounted for movement toward and away from the wheel lugs 24.

Single detent drive pawl 54 is mounted upon the detent 42 on the backside thereof. Therefore, it may be seen that if the roll ahead feature is not to be used, the operator could remove and discard the trojan roll ahead pawl 38 and reverse the detent 42 so that the single detent drive pawl 54 engaged the lugs 24. The spring 50 would always press the pawl 54 against the lugs so the operation of the system would be normal. I.e., if the trojan drive pawl 32 were oscillated, it would engage the lugs, driving the wheel forward and the single detent drive pawl 54 would prevent the wheel from rolling back as is conventional.

However, to operate with the roll ahead feature, it is necessary to attach lanyard 56 to the detent 42, conviently to the single detent drive pawl 54. The lanyard 56 is attached by disengaging spring 58 to the drive arm 28 near the top thereof. The disengaging spring 58 and the engaging spring 50 are each helical tension springs.

The lugs 24 are mounted upon the rim 52 of the wheel 18 at a regular pitch "P". The lugs have height "H" above the rim of the wheel. The lugs have width "W" along the circumference of the wheel.

Trojan distance "TD" is that distance between the trojan drive pawl face 34 and the trojan roll ahead pawl face 40. The trojan distance is equal to the pitch "P" plus the lug width "W" plus the clearance. The clearance is equal, approximately, to the lug width. Detent distance "DD" is the distance between the working face of the detent roll ahead pawl 48 and the face of the detent drive pawl 46.

The lug 24 is said to be on top dead center when it is vertically above the axle 22 as is the lug which is in engagement with the trojan drive pawl 32 in FIG. 2. The detent distance "DD" is equal, approximately, to the lug width "W" plus the clearance. The clearance is about the same for the detent distance as the trojan distance although the tolerences are not particularly critical. If the term "distance from the pawl to the lug" is used, it will be understood that if one of the detent pawls is against one of the lugs, the other detent pawl will have a certain distance between the pawl and the lug. This will be the clearance or the distance from the pawl to the lug. Likewise, if one of the trojan bar pawls is against the lug, the other pawl will be a certain distance between the pawl and the lug. The clearance will be at least about twice sufficient distance for the pawls to move past the lug into an engagement or disengagement position.

The detent distance can span either a single lug plus the spacing of the pawl to the lug, or it could span several lugs with the distance between the pawl and lug. The trojan distance will be equal to a single pitch or a multiple of pitches plus the lug width plus the distance from the pawl to the lug.

Also, it will be understood from the operation as explained later that the trojan bar operates best on the forward side of the wheel. I.e., because of the fact that the trojan roll ahead pawl must rise above the lug that it is easier to design the machine if the trojan bar works more forward of the center of the wheel than back of the center of the wheel.

The trojan distance can be greater than the two pitches, but the stroke can be only equal to one pitch plus the clearance. The trojan distance and the detent distance can be considered slots. A block between lugs can be substituted for the detent slot. The general arrangements of the parts are shown in the drawing.

For the proper operation of the mechanism, there is a particular relationship between the length of the trojan bar stroke and the clearance of the trojan bar and the detent and, also, the placement of the detent and the length of the lanyard and disengaging spring 5. The description of the operation will show that.

FIG. 2 shows the operation with the trojan bar making the forward stroke on level ground. Therefore, the trojan bar driving pawl 32 is engaged with the lug 24, pushing the vehicle forward. The detent is moving forward, however, the detent pawls have not engaged the lugs 24. As may be seen, with continued forward movement, the lug proximate the detent roll ahead pawl will be forward of that pawl by the time the pawl reaches the top of the lug. Should the pawl 48 land upon top of the lug 24, it will not bind the wheel or stop the wheel, but the wheel will continue to roll and the pawl fall down against the rim of the wheel. Of course, when the lug 24 strikes the cam surface under the drive lug 46, it will raise the detent 42, but it will not stop or impede the progress.

Forward motion will continue until the lug at the detent space is located approximately halfway between the roll ahead pawl 48 and the drive pawl 46. This will be the forward position of the stroke of the trojan bar 26 in the driving mode. Therefore, at this point, the trojan bar begins to oscillate back. If the vehicle tends to roll back, the lug will roll back to the drive pawl 46 on the detent and be stopped there. If the vehicle is on level ground as the trojan bar oscillates back, the disengaging spring 58 and the lanyard 56 will pull the detent 42 back as the oscillation continues back and the cam 36 on the drive pawl 32 will cause the trojan bar to raise up and ride over the lug 24. The diameter of the wheel 18 and the height "H" of the the lugs 24 and the length or height of the roll ahead pawl 38 are so arranged and constructed that the roll ahead pawl 38 will not roll the wheel back. The wheel not having moved since the forward most part of the forward stroke of the trojan bar, the detent will be lifted from the rim and the trojan bar returned until it reaches the back most position. This is not the position as seen in FIG. 4, but is very similar; the exception being that the working face 40 of the roll-back pawl 38 will be contacting the lug 24. All of the clearance will be between the lug 24 and the working face 34 of the driving pawl 32. The trojan bar begins moving forward again, making another stroke as descried above.

If the vehicle is going uphill so the vehicle has a tendency to roll back, the detent will be engaged with the clearance evenly divided between the pawls on the lug 24 at the forward most point of the stroke as described above. However, in this case as the trojan bar 26 begins oscillating back, the wheel will revolve backwards until the lug 24 stops against the detent driving pawl 46. However, the lug will not slam against the pawl 46, but will be eased back into position by the rearward movement of the trojan bar.

As the trojan bar continues to move backward, the lug will lock the detent in the engaged position by the friction between the lug and the pawl 46. Therefore, the disengaging spring 58 will be extended and, because of this resilient connection, the detent will not release the wheel. The detent will remain engaged to the wheel until the trojan bar has made its full rearward movement as seen in FIG. 4. In that position with the lug resting against the pawl 46, the two lugs will be approximately centered between the pawls 32 and 38 and the clearence, therefore, will be about equally divided between the two trojan bar pawls as seen in FIG. 4. Then, forward movement of the trojan bar will, as the drive pawl 32 engages the lug 24, will roll the wheel forward and as soon as the wheel rolls forward, the pressure of the lug against detent drive pawl 46 will be released and, therefore, the disengaging spring 58 will cause the detent 42 to be withdrawn. It will be understood that the disengaging spring 58 exerts a stronger rotational force or bias upon the detent 42 than the engaging spring 50. This is not necessarily because the spring 58 is stronger than the spring 50, but the combination of the lever arm from the pivot 44 and the strength of the springs 50 and 58 are such that the disengaging spring 58 will override the engaging spring 50 and withdraw the pawl from engagement with the wheel.

Therefore, it may be seen that if the wheel tends to roll back, there will be two distinct steps of the movement of the wheel. The wheel will be moved forward with a large step by action of the drive pawl 32 on the forward oscillation of the trojan bar 26; then, there will be a short backward step as the wheel rolls back until the detent pawl 46 engages the lug 24. Thereafter, the wheel will remain at rest until the next forward oscillation of trojan 26 begins.

If the system tends to roll ahead, in FIG. 2 the wheel will roll ahead until lug 24 engages the working face 40 of the roll ahead pawl 38 on the trojan bar. The detent 42 will engage the rim behind the lug, similar to that described above in the FIG. 2 position and shortly thereafter. As the trojan bar continues to oscillate forward, the roll ahead pawl 48 will contact a lug 24 before the end of the stroke. At the end of the stroke, the lug will be approximately centered between the trojan bar pawls 32 and 38. As the trojan bar is oscillated backward, the cam 36 will raise the trojan bar 26 so that the roll ahead pawl 38 clears the lugs 24.

As the trojan bar is oscillated rearwardly, the detent 42 will not be released because of the friction between the lug and the pawl 48. Then, at the end of the back oscillation of the trojan bar 26, the roll-back pawl 38 will engage one of the lugs 24 and roll the wheel 18 backward. This backward rolling will release the engagement of the detent roll ahead pawl 48 so that the disengaging spring 58 will disengage the detent 42 from the rim and return it to the open position. At the end of the backward oscillation, the roll-back pawl 38 will roll the wheel back so that the lug is approximately centered between the detent pawls 46 and 48. Then as the trojan bar 26 begins its forward movement, the wheel 18 will be rolled forward during this forward oscillation of the trojan bar or drive bar.

Therefore, it may be seen that in the roll ahead operation, the wheel has a definite two-step operation: it rolls ahead with a large step until it stops and it remains stopped until at the end of the backward oscillation of the trojan bar 26, the wheel 18 rolls back a short step and then it rolls ahead again with the following forward oscillation of the trojan bar 26.

Thus, in both the drive mode or the roll ahead mode, the vehicles have a two-step movement.

Although this invention has been described with a specific embodiment of a ground engaging wheel, those skilled in the art will understand that it could work equally well upon a wheel other than a ground engaging wheel.

The stroke of the drive bar 26 is more than the pitch "P" of the lugs, but it is less than the pitch "P" of the lugs plus twice the clearance. We prefer to make the stroke of the drive bar 26 to be equal to the pitch "P" plus the clearance. We also prefer to place the detent position so that the lug is about halfway between the pawls and the end of the forward and the back stroke on level ground.

As an aid to correlating the terms of the claims to the exemplary drawing, the following catalog of elements is provided:

| 10 | pipe | 40 | t.r.a.p. face |
|----|------|----|---------------|
| 12 | sprinkler | 42 | detent |
| 14 | vehicles | 44 | pin |
| 16 | suspension wires | 46 | detent dr. pawl |
| 18 | wheel | 48 | detent r.a. pawl |
| 20 | frame | 50 | engaging spring |
| 22 | axles | 52 | rim |
| 24 | lugs | 54 | single d. dr. pawl |
| 26 | trojan bar | 56 | lanyard |
| 28 | drive arm | 58 | disengage spring |
| 30 | drive means | P | pitch |
| 32 | trojan dr. pawl | H | height |
| 34 | tro. dr. pawl face | W | width |
| 36 | t. dr. pawl cam | TD | trojan distance |
| 38 | t. roll ahead pawl | DD | detent distance |

The embodiment shown and described above is only exemplary. We do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

We claim as our invention:

1. In an agricultural irrigation system having
   a. an elongated pipe adapted to carry a plurality of sprinklers and adapted to carry water under pressure,
   b. a plurality of vehicles movingly supporting said pipe,
   c. at least one drive wheel on each of the vehicles,
   d. lugs at a regular pitch on the drive wheel,
   e. at least one drive bar on the vehicle,
   f. drive means on the vehicle for oscillating the drive bar forward and back,
   g. a drive pawl on the bar having a drive face for drivingly engaging said lugs, and
   h. a detent drive pawl means mounted on the vehicle for preventing the vehicle from rolling back;
   the improved roll ahead structure comprising in combination:

j. a roll ahead pawl on the drive bar having a working face for contacting said lugs spaced from the drive pawl, and k. a detent roll ahead pawl means mounted on the vehicle for movement toward and away from the lugs for preventing the vehicle from rolling ahead.

2. The invention as defined in claim 1 wherein said detent roll ahead pawl means is connected to said drive bar by m. a resilient tension member so that as the drive bar oscillates back, the tension member urges the detent away from the lugs.

3. In an agricultural irrigation system having a. an elongated pipe adapted to carry a plurality of sprinklers and adapted to carry water under pressure, b. a plurality of vehicles movingly supporting said pipe, c. at least one drive wheel on each of the vehicles, d. lugs at a regular pitch on the drive wheel, e. at least one drive bar on the vehicle, f. drive means on the vehicle for oscillating the drive bars forward and back, and g. a drive pawl on the bar having a working face for drivingly engaging said lugs;

the improved roll ahead structure comprising in combination:

h. a roll ahead pawl on the drive bar having a working face for contacting said lugs spaced from the drive pawl, and j. a detent mounted on the vehicle for movement toward and away from the lugs on the drive wheel having i. a drive detent pawl spaced from ii. a roll ahead detent pawl, k. the pawls on the drive bar and the pawls on the detent spaced for the lugs, and the spacing of the pawls on the drive bar from the lugs being about the same as the spacing of the pawls on the detent from the lugs.

4. The invention as defined in claim 3 wherein said detent pawl spacing is less than the pitch of the lugs.

5. The invention as defined in claim 3 wherein said drive means oscillates the drive bar more forward of the top center of the drive wheel than back thereof.

6. The invention as defined in claim 3 wherein said detent pawl spacing is equal to the width of each lug plus twice sufficient distance for the pawls to move past the lug into an engagement position.

7. The invention as defined in claim 3 wherein said drive means oscillates the drive bar at a preset stroke which is m. more than the pitch of the lugs and n. which is less than the space between the pawls on the drive bar, and o. the pawl spacing on the drive bar is less than twice the pitch of the lugs.

8. The invention as defined in claim 3 wherein said detent is connected to said drive means by m. a resilient tension member so that as the drive bar oscillates back, the tension member urges the detent away from the lugs.

9. The invention as defined in claim 8 wherein said drive means oscillates the drive bar a preset stroke which is n. more than the pitch of the lugs and o. which is less than the space between the pawls on the drive bar and p. the space between the pawls on the drive bar is less than twice the pitch of the lugs.

10. The invention as defined in claim 9 wherein said detent pawl spacing is equal to the width of each lug plus twice sufficient distance for the pawls to move past the lug into an engagement position.

11. The invention as defined in claim 10 wherein said detent pawl spacing is less than the pitch of the lugs.

12. The invention as defined in claim 11 wherein said drive means oscillates the drive bar more forward of the top center of the drive wheel than back thereof.

13. In an agricultural irrigation system having a. an elongated pipe adapted to carry a plurality of sprinklers and adapted to carry water under pressure, b. a plurality of vehicles movingly supporting said pipe, c. at least one drive wheel on each of the vehicles, d. lugs on the drive wheel, e. at least one drive bar on the vehicle, f. drive means on the vehicle for oscillating the drive bar forward and back, and g. a drive pawl on the bar for drivingly engaging said lugs;

the improved method of controlling each of the vehicles from a tendency to run forward comprising the steps of:

h. rolling the drive wheel forward during the forward oscillation of the drive bar, j. holding the drive wheel with a detent pawl against one of the lugs, thus k. preventing forward rotation during the first portion of the back oscillation, m. rolling the drive wheel back during the last portion of the back oscillation, thus n. releasing the detent pawl.

14. The invention as defined in claim 13 wherein the vehicles are controlled from a tendency to run backward by the steps of o. rolling the drive wheel forward during the forward oscillation of the drive bar, p. permitting the wheel to roll back during the first portion of the back oscillation, q. holding the drive wheel with a detent pawl against one of the lugs, thus r. preventing backward rotation during the back oscillation, and thereafter s. repeating the rolling of the drive wheel forward, thereby t. releasing the detent pawl.

15. In an agricultural irrigation system having a. an elongated pipe adapted to carry a plurality of sprinklers and adapted to carry water under pressure, b. a plurality of vehicles movingly supporting said pipe, c. at least one drive wheel on each of the vehicles, d. lugs on the drive wheel, e. at least one drive bar on the vehicle, f. drive means on the vehicle for oscillating the drive bar forward and back, and g. a drive pawl on the bar for drivingly engaging said lugs;

the improved method of operating each vehicle comprising:

h. at the beginning of each forward oscillation, dropping a slot on the drive bar over some of the lugs, j. at the end of each forward oscillation, blocking with a detent some of the lugs, and k. withdrawing the drive bar slot at the end of the forward oscillation, and m. withdrawing the detent block at the beginning of the forward oscillation, n. the blocking with a detent blocks both forward and rearward movement and the slot on the drive bar will both drive the wheel uphill and retard the wheel downhill.

* * * * *